(12) United States Patent
Lee

(10) Patent No.: US 11,810,114 B2
(45) Date of Patent: *Nov. 7, 2023

(54) FINANCIAL PAYMENT METHOD AND PAYMENT SYSTEM USING MOBILE DEVICE

(71) Applicant: GHOST PASS Inc., Gwangju (KR)

(72) Inventor: Seon Gwan Lee, Gwangju (KR)

(73) Assignee: GHOST PASS Inc., Gwangju (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/644,676

(22) Filed: Dec. 16, 2021

(65) Prior Publication Data

US 2022/0108324 A1  Apr. 7, 2022

Related U.S. Application Data

(63) Continuation of application No. 16/349,503, filed as application No. PCT/KR2017/012829 on Nov. 14, 2017, now Pat. No. 11,238,454.

(30) Foreign Application Priority Data

Nov. 14, 2016 (KR) .................. 10-2016-0151016

(51) Int. Cl.
*G06Q 20/40* (2012.01)
*G06Q 20/32* (2012.01)
(Continued)

(52) U.S. Cl.
CPC ....... *G06Q 20/40145* (2013.01); *G06F 21/32* (2013.01); *G06Q 20/322* (2013.01);
(Continued)

(58) Field of Classification Search
None
See application file for complete search history.

(56) References Cited

U.S. PATENT DOCUMENTS 6,167,517 A  12/2000  Gilchrist et al.
7,360,689 B2  4/2008  Beenau et al.
(Continued)

FOREIGN PATENT DOCUMENTS

EP  1528518 A1  5/2005
JP  2001-325549 A  11/2001
(Continued)

OTHER PUBLICATIONS

Epo, Extended European Search Report of EP 17869100.2 dated May 25, 2020.
(Continued)

*Primary Examiner* — Christopher Bridges
(74) *Attorney, Agent, or Firm* — Knobbe, Martens, Olson & Bear, LLP

(57) ABSTRACT

This application relates to a financial payment method using biometric information. Biometric information of an individual collected in a mobile device of an affiliated member is transmitted to a mobile device of the individual to allow the biometric information to be authenticated in the mobile device of the individual. After the authentication of the biometric information, a substitute key that corresponds to a card password preset by the individual is inputted, and a financial payment is requested based on the payment content.

18 Claims, 7 Drawing Sheets

(51) Int. Cl.
  *G06Q 20/38* (2012.01)
  *H04L 9/32* (2006.01)
  *H04L 9/40* (2022.01)
  *G06F 21/32* (2013.01)
  *G06V 40/12* (2022.01)

(52) U.S. Cl.
  CPC ....... *G06Q 20/3227* (2013.01); *G06Q 20/382* (2013.01); *G06Q 20/3823* (2013.01); *G06Q 20/38215* (2013.01); *G06V 40/12* (2022.01); *H04L 9/3231* (2013.01); *H04L 9/3242* (2013.01); *H04L 63/0428* (2013.01); *H04L 63/0861* (2013.01); *H04L 2209/56* (2013.01)

(56) References Cited

U.S. PATENT DOCUMENTS

| | | | |
|---|---|---|---|
| 7,565,329 | B2 | 7/2009 | Lapsley et al. |
| 8,028,896 | B2 | 10/2011 | Carter et al. |
| 8,666,895 | B2 * | 3/2014 | Grigg ................ G06Q 20/3223 705/16 |
| 8,762,211 | B2 * | 6/2014 | Killian .................. G06Q 40/10 705/64 |
| 9,519,901 | B1 * | 12/2016 | Dorogusker ....... G06Q 20/3226 |
| 9,537,654 | B2 | 1/2017 | Botero Montano |
| 9,712,524 | B2 | 7/2017 | Chang et al. |
| 10,282,723 | B2 | 5/2019 | Lim |
| 10,380,605 | B2 * | 8/2019 | Groff .................... G06Q 30/02 |
| 2003/0051138 | A1 | 3/2003 | Maeda et al. |
| 2008/0222048 | A1 | 9/2008 | Higgins et al. |
| 2010/0082444 | A1 | 4/2010 | Lin et al. |
| 2011/0016053 | A1 | 1/2011 | Dittmer |
| 2011/0142234 | A1 | 6/2011 | Rogers |
| 2013/0040606 | A1 | 2/2013 | Naccache |
| 2013/0159196 | A1 | 6/2013 | Dizoglio et al. |
| 2014/0282878 | A1 | 9/2014 | Ignatchenko et al. |
| 2015/0088755 | A1 | 3/2015 | Sobel et al. |
| 2016/0019547 | A1 | 1/2016 | Gurnani et al. |
| 2016/0155112 | A1 | 6/2016 | Phillips et al. |
| 2016/0321627 | A1 | 11/2016 | Mccracken et al. |
| 2017/0244702 | A1 | 8/2017 | Jwa et al. |

FOREIGN PATENT DOCUMENTS

| | | |
|---|---|---|
| JP | 2001-344544 A | 12/2001 |
| JP | 2002-32176 A | 1/2002 |
| JP | 2004-110352 A | 4/2004 |
| JP | 2008-217257 A | 9/2008 |
| JP | 2009-86699 A | 4/2009 |
| KR | 20-2009-0011127 U | 10/2009 |
| KR | 10-0997820 | 12/2010 |
| KR | 10-2011-0055112 A | 5/2011 |
| KR | 10-2014-0141984 A | 12/2014 |
| KR | 10-2015-0088768 A | 8/2015 |
| KR | 10-2015-0098002 | 8/2015 |
| KR | 10-2016-0002623 A | 1/2016 |
| KR | 10-2016-0013221 A | 2/2016 |
| KR | 10-2017-0098105 | 8/2017 |
| KR | 10-2018-0019777 | 2/2018 |
| KR | 10-1926709 | 12/2018 |
| KR | 10-1960799 | 3/2019 |
| KR | 10-2156184 | 9/2020 |
| KR | 10-2156184 B1 | 9/2020 |
| KR | 10-2020-0116758 | 10/2020 |
| RU | 2589847 C2 | 7/2016 |
| WO | WO 2007-091869 | 8/2007 |
| WO | WO 2014/015346 A1 | 1/2014 |
| WO | WO 2015-066028 | 5/2015 |
| WO | WO 2015/146178 A1 | 10/2015 |
| WO | WO 2015/155840 A1 | 10/2015 |

OTHER PUBLICATIONS

European Office Action dated Jul. 6, 2021, in Counterpart European Patent Application No. 17869100.2 (7 pages in English).
Russian Office Action dated Jul. 12, 2021, in Counterpart Russian Patent Application No. 2019117368 (8 pages in Russian).
Russian Office Action dated Mar. 18, 2021 in corresponding Russian Patent Application No. 2019117368 (10 pages in Russian).
Japanese Office Action dated Dec. 7, 2021, in counterpart Japanese Patent Application No. 2019-547055 (5 pages in Japanese).
Notice of Allowance issued in U.S. Appl. No. 16/349,503, dated Sep. 17, 2021.
Non-Final Rejection issued in U.S. Appl. No. 16/349,503, dated May 19, 2021.
Advisory Action issued in U.S. Appl. No. 16/349,503, dated Apr. 19, 2021.
Final Rejection issued in U.S. Appl. No. 16/349,503, dated Feb. 9, 2021.
Non-Final Rejection issued in U.S. Appl. No. 16/349,503, dated Aug. 31, 2020.
Advisory Action issued in U.S. Appl. No. 16/349,503, dated Apr. 7, 2020.
Final Rejection issued in U.S. Appl. No. 16/349,503, dated Feb. 4, 2020.
Non-Final Rejection issued in U.S. Appl. No. 16/349,503, dated Sep. 26, 2019.
International Search Report and Written Opinion dated Mar. 21, 2018 in International Application No. PCT/KR2017/012829, in 16 pages.

* cited by examiner

FINANCIAL PAYMENT METHOD AND PAYMENT SYSTEM USING MOBILE DEVICE

CROSS-REFERENCE TO RELATED APPLICATION

This application is a continuation of U.S. patent application Ser. No. 16/349,503 filed on May 13, 2019, which is a U.S. national phase application, pursuant to 35 U.S.C. § 371, of PCT/KR2017/012829, filed Nov. 14, 2017, designating the United States, which claims priority to Korean Application No. 10-2016-0151016, filed Nov. 14, 2016. The entire contents of the aforementioned patent applications are incorporated herein by this reference.

BACKGROUND

Technical Field

The present disclosure relates to a financial payment method and payment system using a mobile device, and more particularly, to a method and system for making a payment by mutually verifying biometric information and financial information in two mobile devices.

Description of Related Technology

A payment system based on fingerprint recognition was first introduced to private businesses in the U.S. in 2007. However, the payment system has limitations in protecting personal information in that biometric information of individuals are stored in a specific device of a third party or accessible through a network exposed to the risk of hacking, which is why the payment system is not widely used now. Moreover, the fingerprint recognition-based payment system imposes a cost constraint on offline affiliate members because every offline affiliate member should be provided with an expensive fingerprint sensor for fingerprint recognition. In 2007, businesses using the fingerprint recognition-based payment system actually declared bankruptcy because of financial deficit caused by the purchase of a 2 to 3 million-dollar payment POS device.

Recently, the Japanese government has attempted to adopt other fingerprint recognition-based payment systems. If a visitor to Japan puts two fingers on a fingerprint reader and inputs credit card information in an airport, the visitor may pay simply through fingerprint recognition in fingerprint recognition-enabled stores or hotels. For this purpose, the Japanese government announced that fingerprint recognition-based payment infrastructure would be deployed all over the nation by 2020 when the Olympics would be held in Tokyo. Although the attempt to deploy the fingerprint recognition-based payment infrastructure at the government level is highly likely to lead to wide use of the fingerprint recognition-based system, the fingerprint recognition-based system also has the same limitations as that in the U.S. due to the cost and insufficient protection of personal information.

SUMMARY

According to embodiments, a financial payment may be made without a physical card by means of a mobile device irrespective of time and place. Further, without the need for deploying additional infrastructure, a financial payment may be made using mobile devices which have been proliferated and are carried by a multitude of users.

Personal information of an individual such as a resident registration number, a fingerprint, and the like, and financial information of the individual such as a card number, a card password, and the like are stored in a mobile device carried by the individual. When the individual makes a financial payment, the personal information and financial information are verified in the mobile device. Therefore, the individual may make a safe financial payment without exposure of the personal information and the financial information.

In one aspect, the present disclosure provides a method of authenticating a financial payment at a first mobile device of a seller. The method comprises: sensing, by a sensor provided in the first mobile device, one or more pieces of biometric information of a purchaser; transmitting, by the first mobile device, the sensed biometric information to a second mobile device that is identified by the purchaser in a predetermined method; receiving, by the first mobile device, information from the second mobile device, wherein the information indicates whether the biometric information that is transmitted by the first mobile device matches biometric information of the purchaser that is pre-stored in the second mobile device; and authenticating, by the first mobile device, a content of the financial payment, when the biometric information that is transmitted by the first mobile device matches the biometric information that is pre-stored in the second mobile device.

In an embodiment, the biometric information may include one or more of fingerprint information, iris information, vein information, electrocardiogram information, and voice information.

In an embodiment, the authentication of the content of the financial payment may further comprise processing the payment in a payment method that is preset in the second mobile device. The preset payment method may comprise using a substitute key that corresponds to a password of a first payment means selected by the purchaser from among one or more payment means. The substitute key may be preset by the purchaser to correspond to a predetermined input key of each digit of the password, from among a set of input keys displayed on the first mobile device. The first payment means may be selected adaptively based on the payment content, from among preset one or more payment methods.

In one embodiment, the transmission of the sensed biometric information may comprise encrypting the sensed biometric information in a predetermined encryption method and transmitting the encrypted biometric information or converting the sensed biometric information to a file in a predetermined format and transmitting the file. The predetermined encryption method may be RC4, OTPad, DES, TDES, AES, IDEA, Dffie-Hellman, DSA, Elgamal, RSA, ECC, SHA, MD5, HAVAL, HMAC, or CBC-MAC. The file in the predetermined format may be an image file, a video file, or a voice file. The format of the file may be determined adaptively based on the sensed biometric information.

In another aspect, a method of performing a financial payment at a second mobile device identified by a purchaser is provided. The method comprises: receiving, by the second mobile device, biometric information of the purchaser from a first mobile device of a seller; verifying, by the second mobile device, whether the biometric information that is received from the first mobile device matches biometric information of the purchaser that is pre-stored in the second mobile device; receiving, by the second mobile device, authenticated payment content from the first mobile device, when the biometric information that is received from the first mobile device matches the biometric information of the purchaser that is pre-stored in the second mobile device; and performing, by the second mobile device, a payment in a payment method that is predetermined with regard to the payment content.

In an embodiment, the method may further comprise receiving one or more pieces of biometric information and one or more payment methods from the purchaser.

In an embodiment, the performing the payment may comprise using a substitute key that corresponds to a password of a first payment means selected by the purchaser. The substitute key may correspond to each digit of the password that is to be input by a user from a combination of input keys displayed on the first mobile device.

In an embodiment, in case of each of the one more payment methods, the first payment means may be set to be a discount for a payment amount, point accumulation, or a statement balance in an order determined by a preset priority. The priority may be reflected adaptively in the payment content.

In another aspect, a computing device including at least one processor, implemented at least temporarily by the at least one processor is provided. The computing device comprises: a sensor unit configured to sense one or more pieces of biometric information of a purchaser; a communication unit configured to transmit the sensed biometric information to a second mobile device that is identified by the purchaser in a predetermined method, and to receive information from the second mobile device in response to the transmission, wherein the information indicates whether the biometric information that is transmitted by the communication unit matches biometric information of the purchaser that is pre-stored in the second mobile device; and a computation unit configured to authenticate payment content, when the biometric information that is transmitted by the communication unit matches the biometric information that is pre-stored in the second mobile device.

In another aspect, a program stored in a computer-readable recording medium, for causing a computing device to perform a financial payment based on biometric information and financial information of a purchaser is provided. The program comprises: an instruction set for receiving, at a first mobile device of a seller, biometric information of the purchaser; an instruction set for verifying whether the biometric information that is received from the first mobile device matches biometric information of the purchaser that is pre-stored in the computing device; and an instruction set for, when the received biometric information matches the pre-stored biometric information, receiving authenticated payment content from the first mobile device, and performing the payment using a substitute key that is received from the purchaser and corresponds to a password of a first payment means that is selected by the purchaser for each of one or more payment methods.

According to the embodiments, even when a financial payment is made using biometric information of an individual, which has strict personal information protection requirements, there is no risk of exposing the biometric information to any devices other than a mobile device of the individual.

Due to the use of widely available mobile devices, both of an individual as a consumer and a business provider as a supplier may make a financial payment with low cost, using biometric information.

A financial payment may proceed in any of various user-selected payment methods, and due to use of a substitute key that corresponds to a password of a financial payment means, exposure of the password of a user to a mobile device of an affiliate member may be prevented.

DETAILED DESCRIPTION

Figure 1:
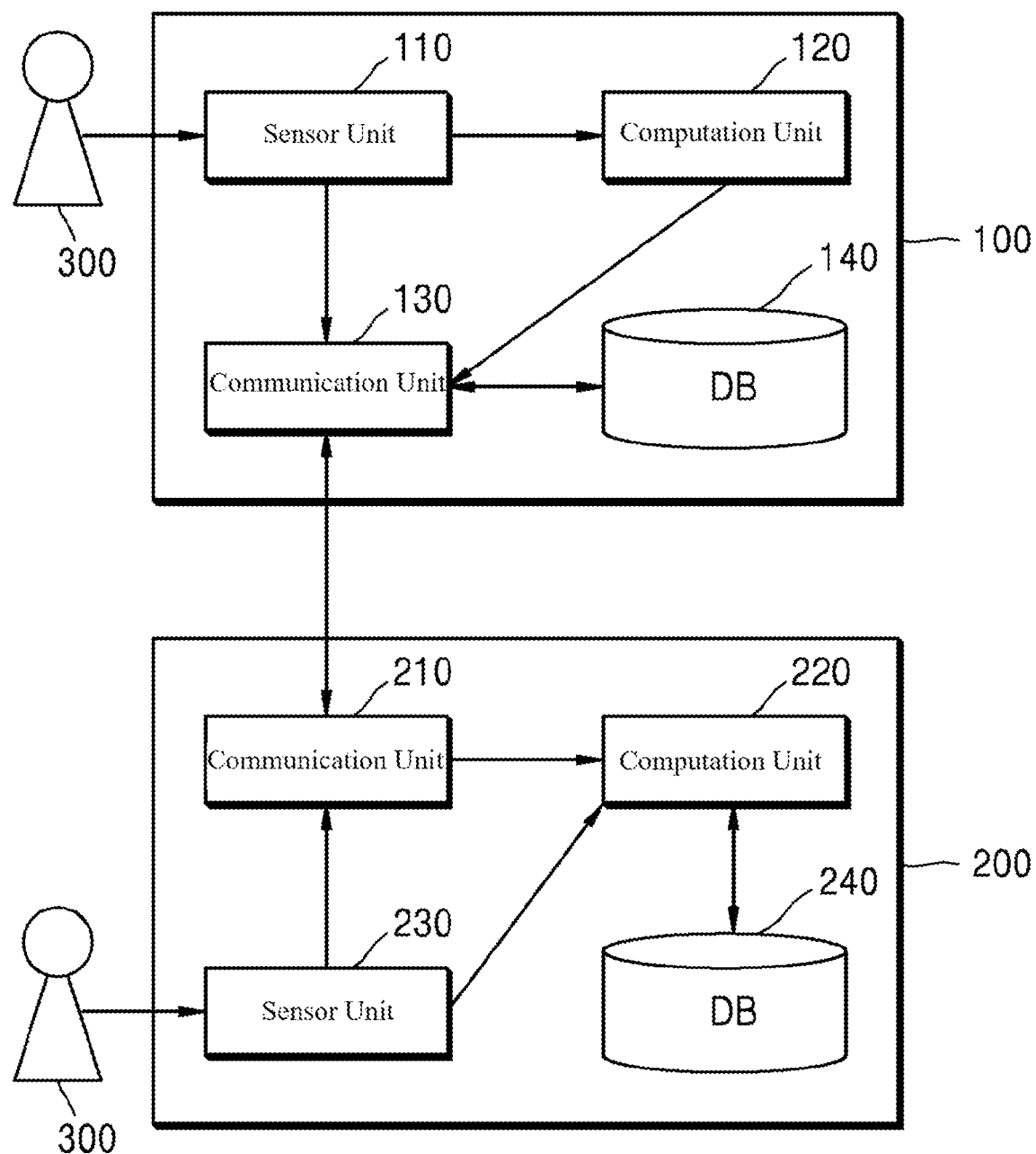
FIG. 1 is a block diagram of a system for processing a financial payment by verifying biometric information, using two mobile devices according to an embodiment.

Embodiments will be described in detail with reference to the attached drawings. However, these embodiments do not limit the scope of the disclosure. In each drawing, like reference numerals denote the same components.

Although terms used in the following description are selected as having general meanings in the related art, the terms may be replaced with other terms according to technology development and/or change, customs, operator preferences, and the like. Therefore, the terms used in the following description should be understood as exemplary terms used to describe the embodiments, not as limiting technical ideas.

Further, the applicant selects some terms arbitrarily in a specific case. In this case, the detailed meanings of the terms will be specified in a corresponding part of the description. Therefore, the terms used herein should be understood not by their names but by their meanings and what is set forth through the specification.

FIG. 1 is a block diagram of a system for processing a financial payment by verifying biometric information, using two mobile devices according to an embodiment. In an embodiment, a financial payment may be made between a user (a purchaser, a consumer, or an individual) and an affiliate member (a seller, a supplier, or a business provider) through interaction between a mobile device 100 of the affiliate member (seller) and a mobile device 200 of the user (purchaser), such as verifying biometric information and financial information between the mobile devices 100 and 200.

The mobile device 100 of the affiliate member includes a sensor unit 110 for sensing biometric information such as a fingerprint, an iris, and the like from a user 300, a communication unit 130 for transmitting and receiving data to and from another device through a wired or wireless network, a computation unit 120 for generating payment content, requesting payment, and approving payment, and a database (DB) 140.

The mobile device 200 of the user includes a sensor unit 230 for sensing biometric information such as a fingerprint, an iris, and the like from the user 300, a communication unit 210 for transmitting and receiving data to and from another device through a wired or wireless network, a computation unit 220 for verifying data match, performing encryption or decryption for the verification of the data match, or pre-registering personal information, biometric information, financial information, and the like, and a DB 240 for storing data that require personal information security, such as personal information, biometric information, financial information, and the like.

According to an embodiment, biometric information of the user 300 is sensed by the mobile device 100 of the affiliate member, the sensed biometric information is authenticated by the mobile device 200 of the user 300, and the financial payment is made in a preset user payment method, for example, with a pre-registered credit card. To do this, a substitute key can be inputted on the mobile device 100 of the affiliate member, the inputted substitute key can be authenticated by the mobile device 200 of the user 300, and a request for payment by the credit card can be made on the mobile device 200, thereby processing the payment by a server (not shown) of a company managing the credit card. In the financial payment method according to an embodiment, since all of personal information, biometric information, and financial information of the user 300 that need to be securely protected are authenticated directly by the mobile device 200 of the user 300, a high level of information protection can be achieved. The user 300 may make a financial payment directly through the mobile device 100 of the affiliate member by using the user's biometric information and the information (the personal information, the biometric information, the financial information, and the like) set in the mobile device 200, without having to use a physical card.

More specifically, interaction between the mobile device 100 of the affiliate member and the mobile device 200 of the user will be described in detail with reference to FIGS. 2 and 3.

Figure 2:
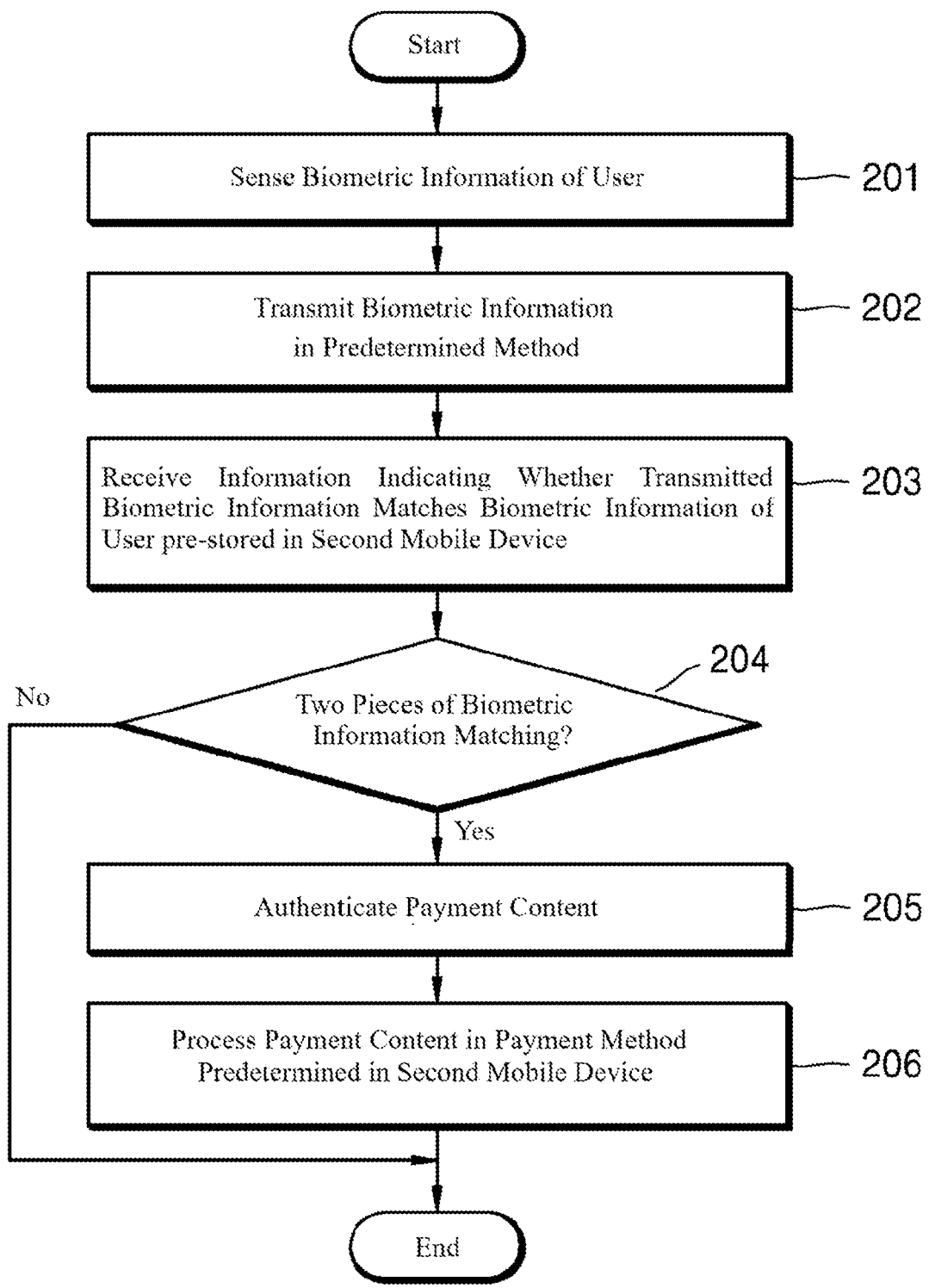
FIG. 2 is a flowchart illustrating a method of processing a financial payment by verifying biometric information of a consumer according to an embodiment.

FIG. 2 is a flowchart illustrating a method of processing a financial payment by verifying biometric information of a consumer according to an embodiment. When a financial payment is processed by verifying biometric information of a consumer in a mobile device of an affiliate member, the following steps may be performed.

In step 201, one or more pieces of biometric information of a user are sensed. The user refers to an individual (i.e., a consumer) who is to pay. The biometric information may be a fingerprint, an iris, a vein at a specific position, an electrocardiogram, or voice. Further, the fingerprint may be a fingerprint of a specific finger set by the user (e.g., a fingerprint of the left ring finger). Regarding the iris, the user may preset the left pupil, the right pupil, or both pupils, and use the preset pupil(s) as an object to be sensed. Regarding the vein at a specific position, the user may preset a position such as information on a vein on the right palm or the left wrist. Regarding the voice, various types of sounds in addition to the voice are available, such as whistle, cough, and the like. In case of the voice, a specific word, sentence, name, or the like, which is spoken, may be preset. As such, biometric information is not only information sensed from a part of the user's body but also any type of information selected and set by a user, thereby ensuring a high level of security for financial transactions. In other words, as a user can set the biometric information on his or her own (without sharing it with others), a wide choice of biometric information is available for financial transactions.

For example, in step 201, a user A may pre-register the fingerprint of his/her left ring finger in his/her mobile device (referred to as a 'second mobile device') and allow a mobile device of an affiliate member (referred to as a 'first mobile device') to recognize the fingerprint of the left ring finger, thereby enabling the fingerprint information of the user A to be sensed as biometric information.

In step 202, the mobile device of the affiliate member transmits the sensed biometric information to the mobile device of the user in a predetermined method. The mobile device of the user to receive the sensed biometric information may be identified by an input of the user. In other words, the user allows the user's biometric information to be sensed and inputs the user's mobile device number, thereby presenting a means to authenticate information of the user to the affiliation member.

Since biometric information may have various types, it may be transmitted in different file formats depending on the types of biometric information. Further, in view of the nature of biometric information, the biometric information may be encrypted for security in various manners or converted to a preset file format for transmission, instead of a file format inherent to the biometric information. For example, fingerprint information may be generated as an image file, encrypted in an SHA scheme, and then transmitted. Herein, the image file may be converted to one type selected from among various extensions. Alternatively, fingerprint information may be generated as a video file.

The encryption method may be appropriately selected and performed by an operator. For bi-directional encryption, RC4, OTPad, DES, TDES, AES, IDEA, and the like are available as a symmetrical key scheme, and Diffie-Hellman, DSA, Elgamal, RSA, ECC, and the like are available as an asymmetrical key scheme.

For uni-directional encryption that ensures integrity, SHA, MD5, HAVAL, HMAC, CBC-MAC, and the like are available. In various embodiments, any of the encryption methods may be selected and used. Particularly, a certain encryption method that is best for a particular type of biometric information can be selected, thereby primarily preventing the transmitted biometric information from being exposed. Further, in various embodiments, even though the transmitted biometric information is exposed to an unauthorized third party over a network, the third party would not be able to obtain personal information on the individual because the transmitted biometric information does not have that personal information. That is, even though the user exposes his or her biometric information to the mobile device of the affiliate member, the user's personal information is not exposed.

In step 203, information indicating whether the transmitted biometric information matches the biometric information of the user stored in the mobile device of the user is received from the mobile device of the user. The transmitted biometric information is data sensed by the mobile device of the affiliate member, and the biometric information stored in the mobile device of the user is data pre-stored by the user. If the two data match, a financial transaction may be carried out using personal information and financial information pre-stored along with the biometric information in the mobile device of the user as an entity for the financial transaction. For example, if a user A allows the mobile device of the affiliate member to sense fingerprint information of the user A, and the user A inputs his or her mobile device number, the mobile device of the affiliate member may transmit the sensed information to the mobile device of the user A to verify whether the sensed biometric information matches the pre-stored biometric information of the user A. If the sensed biometric information matches the pre-stored biometric information of the user A (step 204), the mobile device of the user A may transmit a match result to the mobile device of the affiliate member. This implies that the biometric information is authenticated to allow a financial payment to be made using personal information and financial information (e.g., credit card information or the like) of the user A pre-stored in the mobile device of the user A.

If the biometric information stored in the mobile device of the user A does not match the biometric information sensed by the mobile device of the affiliate member (step 204), the financial payment is terminated without a further progress. In other words, the financial payment may not be made using the personal information and financial information of the user A stored in the mobile device of the user A.

If the biometric information stored in the mobile device of the user A matches the biometric information sensed by the mobile device of the affiliate member (step 204), payment content is authenticated in step 205. The payment content refers to details of the payment that are generated for the authenticated user. For example, if a user A, who wants to pay his or her a lunch order for KRW 8,000 at a restaurant (affiliate member), puts his or her fingerprint on a mobile device of the restaurant and inputs his or her mobile device number, payment content is generated to allow the user A to pay KRW 8,000 for the lunch by using credit card information pre-stored in the mobile device of the user A.

In step 206, the payment content is processed in a payment method preset in the user's mobile device. The user may preset one or more payment means in the user's mobile device, for financial transactions, and make a payment by a selected one of the payment means. The user may set a basic payment means, or each time a financial transaction is carried out, the user may view a payment means list, select a payment means, and set the selected payment means. In various embodiments, financial payment methods may be displayed and selected under various conditions to maximize user convenience. Once the user pre-registers one or more payment methods in the user's mobile device, various display methods and input methods for selection, which are not described herein, may be used and actually implemented.

In various embodiments, various payment methods may be performed. The payment methods may include general payment by card, real-time account transfer, non-real-time account transfer, payment by mobile phone, payment by pre-paid on-line certificate, payment by rechargeable certificate, payment by points, and the like. A plurality of types of payment may be preset to provide an appropriate payment method according to a mobile device of an affiliate and a mobile device of a user.

According to an embodiment, the predetermined payment method may perform authentication using a substitute key for a specific payment means selected from among one or more payment means by the user. A substitute key corresponds to a unique password of the specific payment means, which is preset by the user and stored in the mobile device of the user. Specifically, the substitute key is preset in correspondence with the respective digits of the user's password among a combination of input keys displayed on the mobile device of the affiliate member. For example, a user A may store all information (a card number, an expiration date, and the like) required to pay by a credit card as a payment means in the mobile device of the user A. If the password of the credit card is 1234, the password has been preset between the user A and a credit card company to allow the user A to use the credit card. The user A may set a key substituting for each digit of the card password on his or her own. For example, a substitute key for the numeral 1 in the first digit may be a special character '?,' a substitute key for the numeral 2 in the second digit may be a special character '@' and a substitute key for the numeral 3 in the third digit may be an English letter 'f' (lower case). Numbers, English alphabets, special characters, and Korean vowels or consonants, which are available as substitute keys are exposed on a general keyboard. For example, a Hangeul-Dubeolsik keyboard (106 keys) is configured, which may be used in various embodiments. In another example, payment by mobile phone may be made. The user may preset a password and use a substitute key that corresponds to the password. Further, for payment by mobile phone, a mobile phone number may be input. Further, as the resident registration number of the individual is input, payment may be made, even when a mobile phone number is changed, with the changed mobile phone number. In this case, all cards registered with the resident registration number are available as payment means. If there are various payment means, various embodiments may be implemented to allow payment content to be also processed by new payment means. Likewise, a substitute key may be set for a password used for a corresponding payment means. The password may be input to the mobile device of the affiliate member, and authenticated in the mobile device of the user.

Accordingly, in an embodiment, since the user uses a substitute key, exposure of the password of the user's credit card to the mobile device of the affiliate member may be prevented. This may be a user-specified security system, not a particular encryption scheme. Accordingly, even though a hacker or the affiliation member obtains the substitute key, the hacker or the affiliation member should hack the substitute key matching the card password stored in the mobile device of the user in order to obtain a number that corresponds to the substitute key. Therefore, the security level for personal information protection is very high.

In an embodiment, the user may pre-store one or more payment methods, and make each financial payment in a selected one of the plurality of payment methods. The one or more payment methods may be selected based on discount or non-discount for a payment amount, a discount percentage, point accumulation or non-accumulation, accumulated points, inclusion or non-inclusion as a record of card payment, the sum of amounts paid by card, or the like. A default value may be preset for priority based on the mobile device of the affiliate member and the features of a payment means. For example, a mobile device of a specific affiliate member may offer 10% off the price of a meal for payment by a credit card P in a restaurant. When the user intends to make a payment on the mobile device of the affiliate member according to this feature, if the user has the credit card P as a payment means, a discount for the card may be applied and the resulting price may be displayed. For various features such as cash back saving, point accumulation, point use, and the like, a discount and point accumulation/available details for payment may automatically be displayed for each payment means. Herein, the highest discount percentage or an offer of accumulation of a highest point has priority.

Further, the user may prioritize reference conditions in advance, and determine the best payment method calculated based on priority levels to be a payment means. The priority levels may be reflected adaptively in payment content in each financial payment. For example, if a specific restaurant offers 30% off the total amount of meals paid by the credit card P, the user may preset this condition as priority, and if a payment is made in the restaurant, the credit card P may be selected and the payment is made with the credit card P. In the case where the credit card P offers a high discount for a paid amount, but the user assigns higher priority to the sum of amounts paid by card, if a card Q has a very small sum of paid amounts (statement balance), the card Q may be selected and payment may be made with the card Q. The user may freely prioritize the payment methods under various conditions in advance.

In an embodiment, the mobile device of the affiliate member may constitute a list and display the list of payment methods of the user, and prompt the user to directly select and determine a payment means. In various embodiments, the user may pre-store a payment method as financial information in the user's mobile device.

Figure 3:
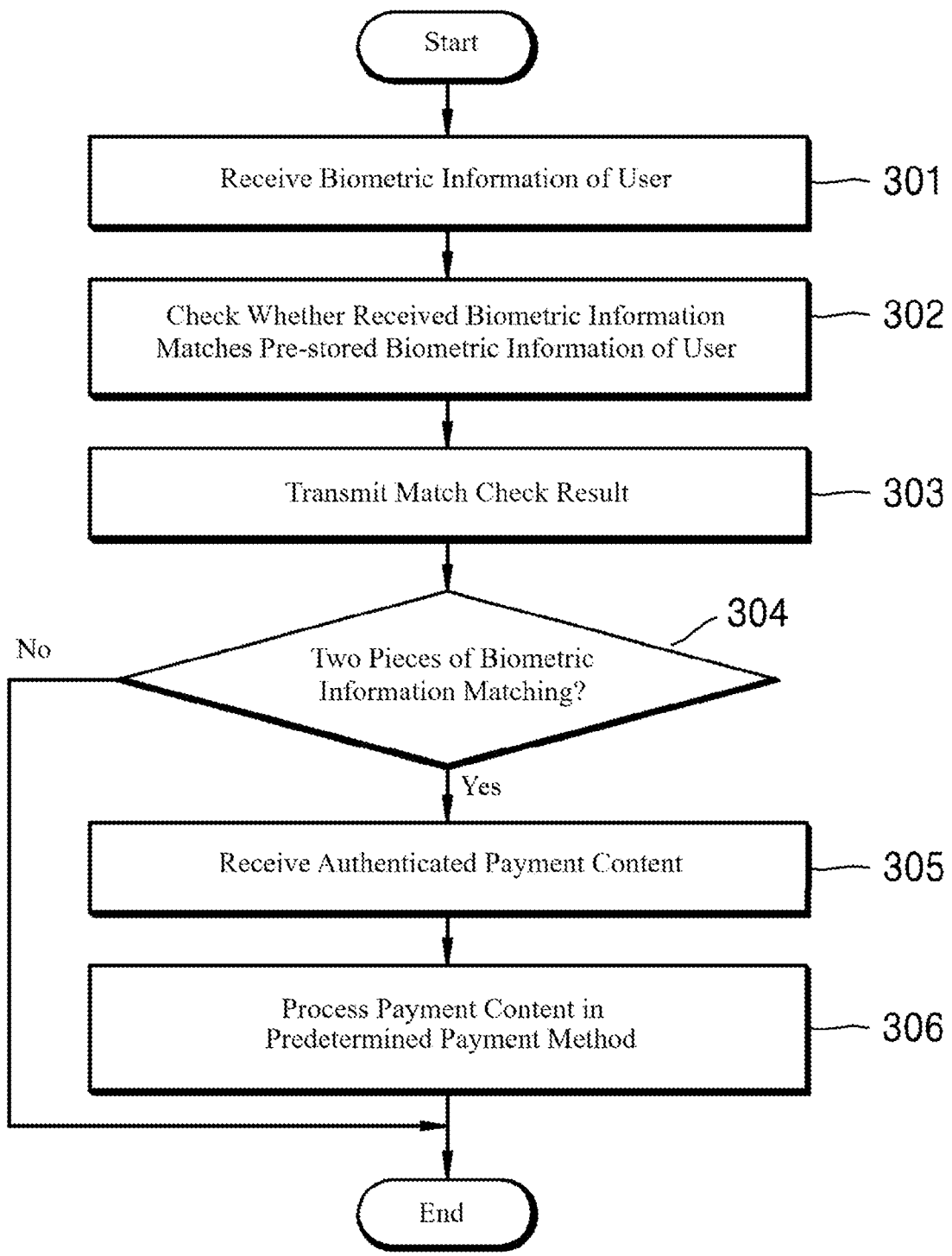
FIG. 3 is a flowchart illustrating a method of processing a financial payment by verifying payment information of an affiliate member according to an embodiment.

FIG. 3 is a flowchart illustrating a method of processing a financial payment by verifying payment information of an affiliate member according to an embodiment. When the mobile device of the user verifies payment information of the affiliate member and makes a financial payment, the following steps may be performed.

In step 301, biometric information of the user is received from the mobile device of the affiliate member (referred to as a 'first mobile device'). The user's biometric information refers to data that the user allows a sensor provided in the mobile device of the affiliate member to sense. The biometric information may be one of a fingerprint, an iris, a vein in a specific body part, an electrocardiogram, voice, and the like. Based on various types of biometric information, there may be various file formats for the biometric information. A file type is not limited based on the type of biometric information. Fingerprint information may be generated and received in an image file or a video file. The type of biometric information and the format of a file that carries the biometric information may also be preset in the user's mobile device by the user. This step corresponds to step 202 of FIG. 2.

In step 302, it is determined whether the received biometric information matches biometric information of the user pre-stored in the mobile device of the user (referred to as a 'second mobile device'). To verify whether the two data match, if the received biometric information has been encrypted, the received biometric information may be decrypted. If the received biometric information is in a specific file format, the received biometric information may be converted to a different format, when needed. Further, the scope of verification for determining match or mismatch between the two pieces of biometric information may include verifying the type of the biometric information (e.g., fingerprint information or iris information), and the file format of the received biometric information (e.g., an image file or a video file). For example, a user A may set the fingerprint of the left ring finger in a mobile device of the user A, for use as biometric information, and set that received information should be in a video file converted from an image file. If the received biometric information is a voice file, it may be determined that the two pieces of biometric information do not match. If the received biometric information is a video file, the video file may be converted to an image file and compared with the fingerprint of the left ring finger stored in the user's mobile device. Before step 302, a step of receiving one or more pieces of biometric information from the user of the user's mobile device in embodiments. The received biometric information may be stored in a DB of the user's mobile device. If biometric information is received from the mobile device of the affiliate member, the received biometric information may be compared with the stored biometric information.

One or more pieces of biometric information may be selected in combination. Once the user pre-stores the selected biometric information in the user's mobile device, the user may use the registered biometric information in subsequent financial payments. Since the user merely stores the biometric information in the user's mobile device without transmitting or storing data to or in the mobile device of the affiliate member, the biometric information requiring personal information protection may be protected sufficiently.

In step 303, the verification result of step 302 is transmitted to the mobile device of the affiliate member. If the received biometric information matches the biometric information stored in the mobile device of the user, the procedure goes from step 304 to step 305 (Yes), and the financial payment is processed. If the two pieces of biometric information do not match, the procedure ends (No) in step 304.

In step 305, when the two pieces of biometric information match, authenticated payment content is received from the mobile device of the affiliate member. The payment content includes information on an amount that the user owes the affiliate member.

In step 306, the received payment content is processed in a payment method preset in the mobile device of the user. Specifically, the payment is processed in a payment method selected from among one or more payment methods. The payment methods may include various online payment methods such as payment by card, payment by mobile phone, account transfer, and the like. Before step 306, a step of receiving information on one or more payment methods from the user of the user's mobile device may be performed. Various payment methods are available, and a plurality of items may also be available for each payment type. For example, 3 different types of credit cards may be registered, 2 different bank accounts may be registered, and a mobile phone authentication procedure may be performed in advance for payment by mobile phone. For payment by card, the user should pre-input information for payment (e.g., a card number, a card expiration date, and the like). Herein, the user may set a substitute key that corresponds to a card password.

If the user inputs the card password through the mobile device of the affiliate member, the user's password may be exposed to the mobile device of the affiliate member, and the user's password may be exposed on the network during transmission to the mobile device of the user. To prevent the exposure, a substitute key for the card password may be input to the mobile device of the affiliate member, and the mobile device of the affiliate member may transmit the substitute key to the mobile device of the user. Therefore, the card password is verified between the mobile device of the user and the card company server, and thus the security measure may be extended.

A substitute key is set to allow a key from a set of input keys displayed on the mobile device of the affiliate member (or the mobile device of the user) to correspond to each digit of the password according to a user input. The mobile device of the user may store substitute key information that corresponds to a password for each card.

Therefore, when a card password is verified between the mobile device of the affiliate member and the mobile device of the user, using a substitute key, the mobile device of the user may request card payment to the card company server. Subsequently, the card company may accept the request and approve the use of the card for sales of the affiliate member.

Figure 4:
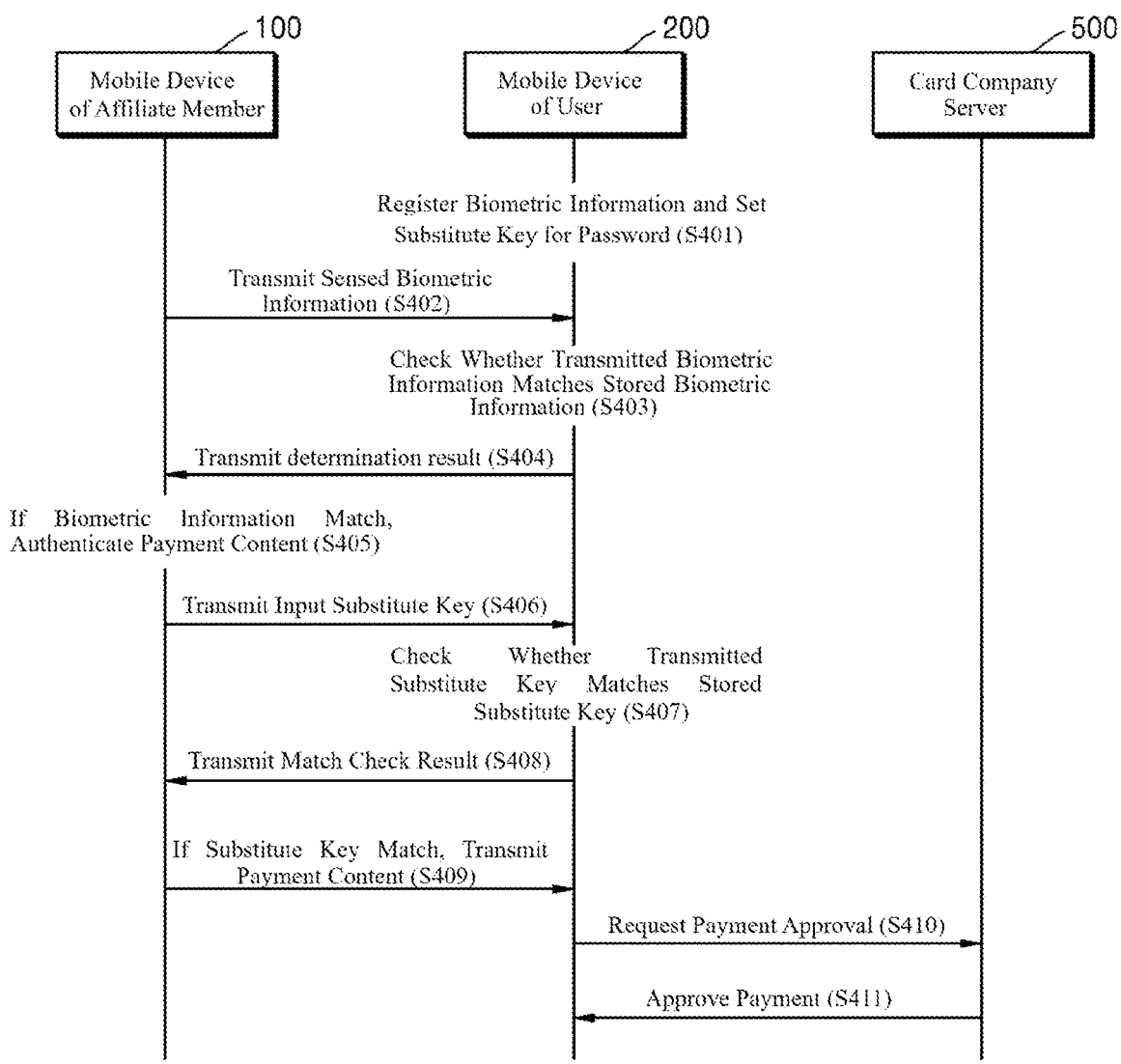
FIG. 4 is a sequence diagram illustrating interactions among a user mobile device, an affiliate member mobile device, and a card company server according to an embodiment.

An embodiment of the financial payment method of the mobile device 100 of the affiliate member has been described with reference to FIG. 2, and an embodiment of the financial payment method from the perspective of the mobile device 200 of the user has been described with reference to FIG. 3. FIG. 4 is a sequence diagram that illustrates interaction among the mobile device 200 of the user, the mobile device 100 of the affiliate member, and a card company server 500, to give a detailed description of interaction between the two mobile devices.

In step S401, the user may register his or her biometric information in the mobile device 200 of the user, store personal information (a name, a date of birth, a residence registration number, and the like), and set one or more payment methods as financial information. Herein, a user-set substitute key may be stored for a password for a specific payment means. The mobile device 200 of the user may authenticate the biometric information and process a payment in the stored payment method.

In step S402, the mobile device of the affiliate member transmits sensed biometric information to the mobile device of the user. In Step S403, the mobile device of the user determines whether the received biometric information matches the pre-stored biometric information. In step S404, the mobile device of the user transmits the determination result to the mobile device of the affiliate member.

In step S405, if the received biometric information matches the biometric information stored in the mobile device of the user, the mobile device of the affiliate member authenticates payment content for the financial payment. In step S406, the mobile device of the affiliate member receives the substitute key that corresponds to the password of the payment means from the user in order to process the payment in the preset payment method, and the mobile device of the affiliate member transmits the substitute key to the mobile device of the user. In step S407, the mobile device of the user verifies whether the substitute key matches the card password. In step S408, the mobile device of the affiliate member transmits the verification result to the mobile device of the affiliate member.

In step S409, if the substitute key matches the card password, the mobile device of the affiliate member transmits the payment content to the mobile device of the user to request the payment.

In step S410, the mobile device of the user requests payment approval to the card company server 500 in the user-preset payment method. While substitute key information is transmitted and received between the mobile device of the user and the mobile device of the affiliate member, a credit card password may be transmitted and received directly between the mobile device of the user and the card company server. In this case, a security measure can be provided by the card company server.

In step S411, regarding the payment content, the card company server 500 may approve the payment to the mobile device of the user.

The mobile device of the affiliate member is not able to know all of personal information, biometric information, and financial information of a user. The mobile device of the affiliate member obtains only sensed biometric information and substitute key information. The biometric information of a user itself does not mean a lot. It has to be combined with personal information of the user to be meaningful in electronic transactions. Therefore, even when a user exposes his or her fingerprint to the mobile device of the affiliate member, it may not create a security problem in electronic transactions. On the contrary, since the personal information, biometric information, and financial information of the user may be stored in the mobile device of the user, and user authentication and card authentication are performed for each financial payment in the mobile device of the user, a high level of security can be achieved. On the other hand, the card company server processes payment directly with the mobile device of the user based on card information of a specific person, and thus the security system may be maintained in a more organized manner than when processing with a plurality of devices of multiple affiliate members.

Figure 5A:
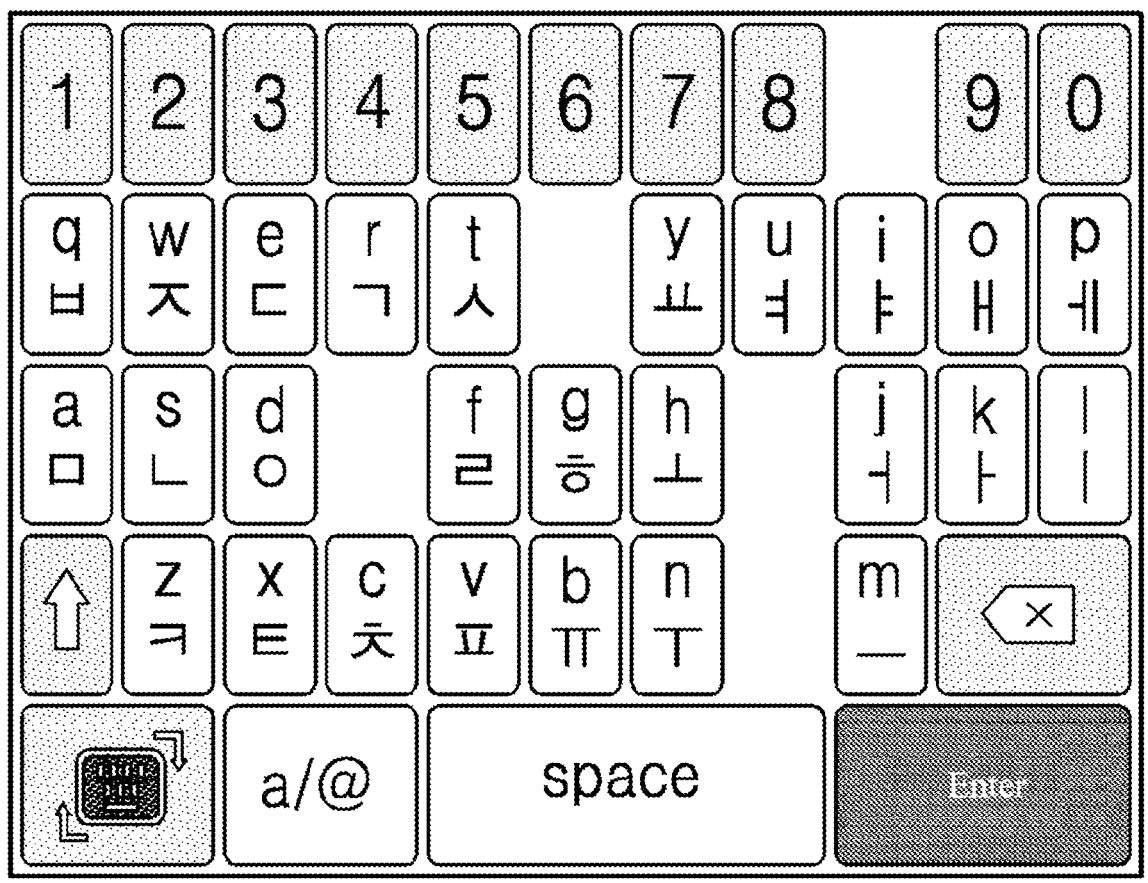
FIGS. 5A and 5B illustrate exemplary keypads for inputting a substitute key, displayed on a mobile device according to an embodiment.
Figure 5B:
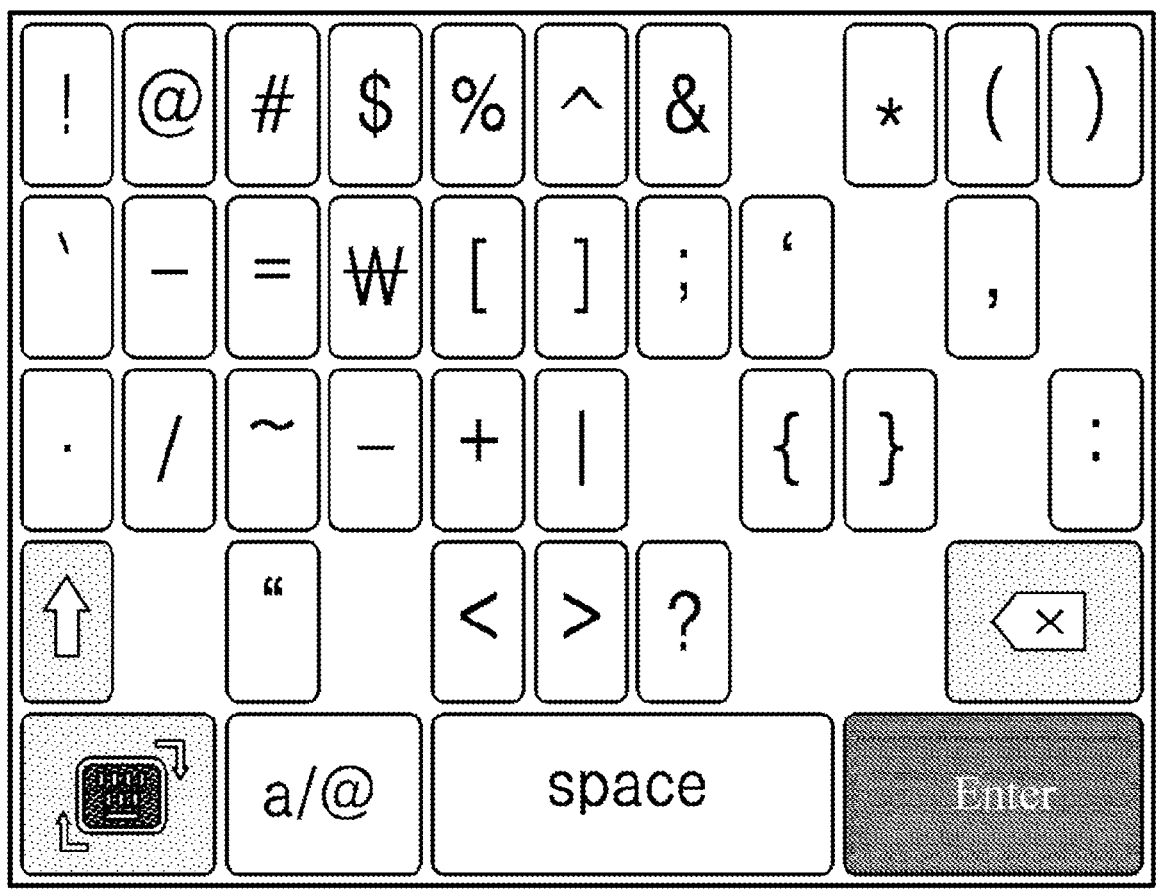

FIGS. 5A and 5B are exemplary keypads displayed on a mobile device to allow a user to input a substitute key, according to embodiments of the present disclosure. The keypad of FIG. 5A includes numbers, English alphabets, Korean vowels, and Korean consonants, and the keypad of FIG. 5B includes special characters. For security, input keys are arranged with spaces in the keyboard layout of an actual keypad. For example, a space is interposed between numbers 8 and 9. The mobile device of the affiliate member may provide a display screen as illustrated in FIG. 5A to the user to allow the user to input a substitute key.

Figure 6:
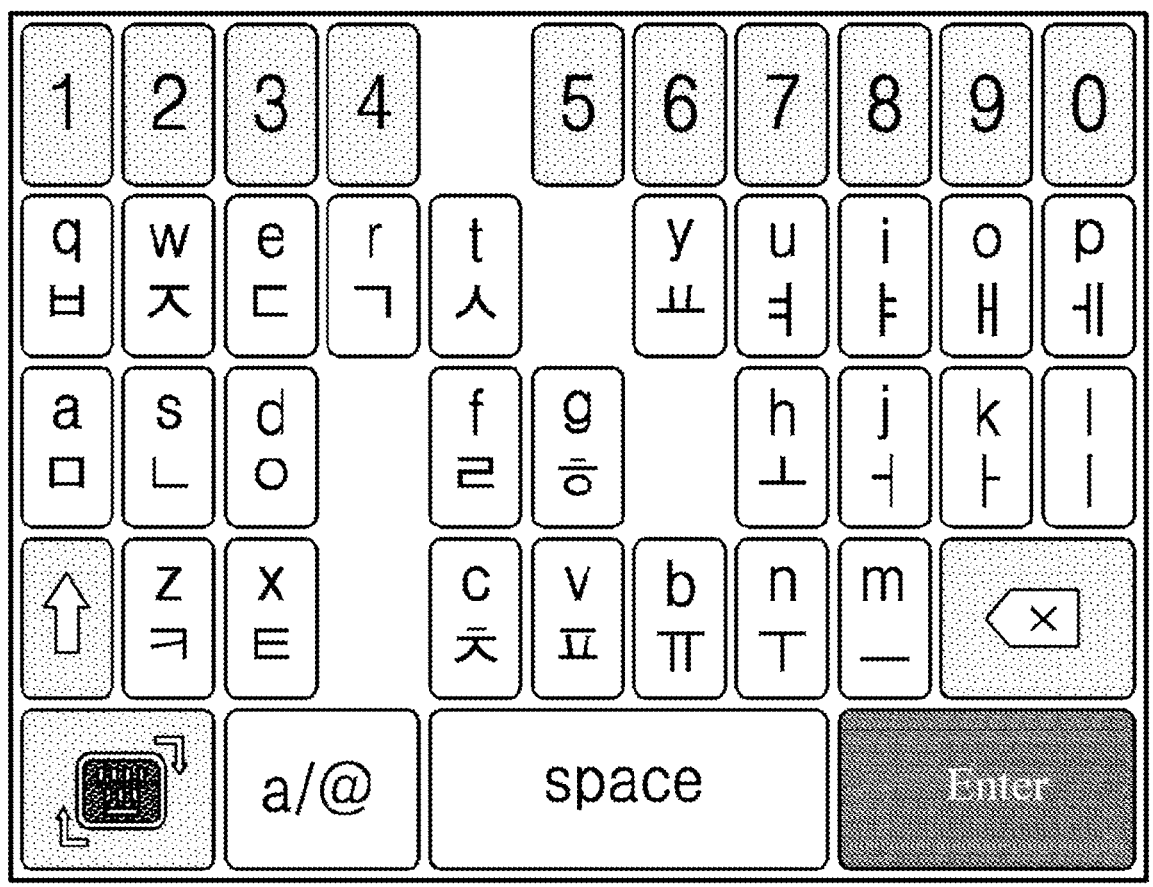
FIG. 6 illustrates an exemplary keypad on which the keys of the keypad illustrated in FIG. 5A are rearranged each time one digit of a substitute key is input according to an embodiment.

In an embodiment, the user may input, on a mobile device of an affiliate member, a substitute key that corresponds to a password of a payment means. Each time the user inputs each digit of the substitute key, the combination of input keys illustrated in FIG. 5A or FIG. 5B may be re-ordered. To further improve security, for a 4-digit substitute key, 4 different types of keyboards may be provided. FIG. 6 illustrates an example that the keyboard illustrated in FIG. 5A is re-ordered each time when each digit of a substitute key is input. Compared to FIG. 5A in which a space exists between numbers 8 and 9, there is no space between numbers 8 and 9 in FIG. 6. While there is no space between numbers 4 and 5 in FIG. 5A, the keys are re-ordered such that there is a space between numbers 4 and 5 in FIG. 6.

The above-described embodiments may be implemented in hardware, software, and/or a combination thereof. For example, the apparatuses, methods, and components described in the embodiments may be implemented using one or more general-purpose computers or special-purpose computers, such as a processor, a controller, an ALU (arithmetic logic unit), a digital signal processor, a microcomputer, an FPGA (field programmable gate array), a PLU (programmable logic unit), a microprocessor, or any other device capable of executing an instruction and responding. A processing device may execute an operating system (OS) and one or more software applications executed on the OS. Further, the processing device may access, store, manipulate, process, and generate data in response to execution of software. To help understanding, the processing device is described as a single one. However, those skilled in the art will understand that the processing device may include a plurality of processing elements and/or a plurality of types of processing elements. For example, the processing device may include a plurality of processors, or one processor and one controller. Further, a different processing configuration such as a parallel processor is available.

Software may include a computer program, a code, an instruction, or a combination of two or more thereof, and may configure a processing device so that the processing device may operate in a desired manner or instruct the processing device independently or collectively. Software and/or data may be embodied permanently or temporarily in some type of machine, component, physical device, virtual equipment, computer storage medium or device, or a transmitted signal wave in order to be interpreted by the processing device or provide an instruction or data to the processing device. The software may be distributed over computer systems connected via a network, and stored or executed in a distributed manner. The software and data may be stored in one or more computer-readable recording mediums.

A method according to an embodiment may be implemented in the form of a program instruction executable by various computer means and recorded in a computer-readable medium. The computer-readable medium may include a program instruction, a data file, and a data structure alone or in combination. The program instruction recorded in the medium may be specially designed and configured for the embodiment, or known and thus available to those skilled in computer software. The computer-readable medium may include hard disk, floppy disk, magnetic media such as magnetic tape, optical media such as CD-ROM and DVD, magneto-optical media such as floptical disk, and a hardware device specially configured to store and execute a program instruction such as ROM, RAM, and flash memory. Program instructions may include machine language code that is produced by a compiler or high-level language code that may be executed by an interpreter. The hardware device may be configured to operate as one or more software modules or vice versa in order to perform operations in the embodiment.

While the embodiments have been described above with reference to the particularly embodiment and the drawings, those skilled in the art will understand that various modifications and variations can be made from the disclosure. For example, even though the above-described techniques may be implemented in a different order from that described and/or the described components such as a system, structure, device, circuit, and so on are combined or merged in a method other than the described method or replaced by other components or equivalents, appropriate results may be achieved. Accordingly, other implementations, other embodiments, the appended claims, and their equivalents fall within the scope of the appended claims.

Both an individual of a consumer side and a business provider of a supplier side may make a financial payment with low cost, using biometric information without deploying additional infrastructure, using already widely available mobile devices.

What is claimed is:

1. A processor-implemented method of authenticating a content of an operation requested by a second user at a first device of a first user, the method comprising:
    sensing, by a sensor provided in the first device of the first user, one or more pieces of biometric information of the second user;
    transmitting, by the first device, the sensed biometric information to the a second device of the second user;
    receiving, by the first device, verification information from the second device, wherein the verification information is a verification result generated by the second device, and the verification information indicates whether the sensed biometric information, being transmitted by the first device, is verified by the second device to match biometric information of the second user that is pre-stored in the second device;
    authenticating, by the first device, the content of the requested operation using the verification information without exposing personal information of the second user to outside of the second device of the second user, in response to the sensed biometric information of the second user that is transmitted by the first device being verified to match the biometric information of the second user that is pre-stored in the second device; and
    processing a payment, as the requested operation, in a payment method that is preset by using the personal information of the second user,
    wherein the sensed biometric information is sensed information of a part of a body of the second user and does not have personal information of the second user for an enhanced security.

2. The method according to claim 1, wherein the biometric information includes one or more of fingerprint information, iris information, vein information, electrocardiogram information, and voice information.

3. The method according to claim 1, further comprising encrypting, by the first device, the sensed biometric information using a predetermined encryption-decryption scheme.

4. The method according to claim 1, wherein the preset payment method comprises using a substitute key that corresponds to a password of a first payment means selected by the second user from among one or more payment means.

5. The method according to claim 4, wherein the first payment means is selected adaptively based on the payment content, from among preset one or more payment methods.

6. The method according to claim 1, further comprising converting the sensed biometric information to a file in a predetermined format and transmitting the file.

7. The method according to claim 3, wherein the predetermined encryption-decryption scheme is RC4, OTPad, DES, TDES, AES, IDEA, Dffie-Hellman, DSA, Elgamal, RSA, ECC, SHA, MD5, HAVAL, HMAC, or CBC-MAC.

8. The method according to claim 6, wherein the file in the predetermined format is an image file, a video file, or an audio file.

9. The method according to claim 6, wherein the format of the file is determined adaptively based on the sensed biometric information.

10. A processor-implemented method of performing an operation, requested from a first device, at a second device, the method comprising:
    receiving, by the second device of a second user, biometric information of the second user from the first device of a first user, the biometric information being sensed by a sensor provided in the first device;
    verifying, by the second device, whether the biometric information that is received from the first device matches biometric information of the second user that is pre-stored in the second device;
    receiving, by the second device, a content of the requested operation from the first device, in response to the biometric information that is received from the first device being verified to match the biometric information of the second user that is pre-stored in the second device; and
    performing, by the second device, the requested operation in a method that is selected based on a priority preset by the second user with regard to the content of the requested operation by using personal information of the second user, in response to the biometric information that is received from the first device, being verified to match the biometric information of the second user that is pre-stored in the second device, wherein the biometric information, being received from the first device, is sensed information of a part of a body of the second user and does not have the personal information of the second user for an enhanced security.

11. The method according to claim 10, further comprising receiving one or more pieces of biometric information.

12. The method according to claim 10, further comprising decrypting the received biometric information in a predetermined encryption-decryption scheme when the received biometric information has been encrypted.

13. The method according to claim 10, further comprising converting the received biometric information to a predetermined format.

14. The method according to claim 13, wherein the format is different from a file format of the received biometric information.

15. A device for authenticating a content of an operation requested by a second user at the device of a first user, the device comprising:
- a sensor configured to sense one or more pieces of biometric information of the second user;
- a transmitter configured to transmit the sensed biometric information to a second device of the second user;
- a receiver configured to receive verification information from the second device in response to the transmission, wherein the verification information is a verification result generated by the second device, and the verification information indicates whether the biometric information, that is transmitted by the transmitter, is verified by the second device to match biometric information of the second user that is pre-stored in the second device; and
- a processor configured to authenticate a content of the requested operation using the verification information without exposing personal information of the second user to outside of the second device of the second user, in response to the biometric information of the second user that is transmitted by the transmitter being verified to match the biometric information of the second user that is pre-stored in the second device, wherein the biometric information is sensed information of a part of a body of the second user and does not have personal information of the second user for an enhanced security, and wherein the processor is configured to process a payment, as the requested operation, in a payment method that is preset by using the personal information of the second user.

16. The device according to claim 15, wherein the processor is configured to encrypt the sensed biometric information using a predetermined encryption-decryption scheme or convert the sensed biometric information to a file in a predetermined format to be transmitted by the transmitter.

17. A non-transitory computer readable medium containing program instructions executed by a processor to perform an operation, requested from a first device, at a second device, the program instructions when executed configured to:
- receive, from the first device of a first user, biometric information sensed of a second user, the biometric information being sensed by a sensor provided in the first device;
- verify whether the biometric information, that is received from the first device, matches biometric information of the second user that is pre-stored in the second device; and
- in response to the biometric information being verified to match the pre-stored biometric information, receive a content of the requested operation from the first device, and perform the requested operation using the data that is obtained from the second user, wherein the biometric information, being received from the first device, is sensed information of a part of a body of the second user and does not have personal information of the second user for an enhanced security between the first device and the second device.

18. The non-transitory computer readable medium of claim 17, wherein the program instructions are further configured to:
- decrypt the received biometric information in a predetermined encryption-decryption scheme when the received biometric information has been encrypted; or
- convert the received biometric information to a predetermined format.

* * * * *